United States Patent
Devaguptapu

(12)
(10) Patent No.: US 6,372,322 B1
(45) Date of Patent: Apr. 16, 2002

(54) SHAPED HONEYCOMB STRUCTURES AND METHOD AND APPARATUS FOR MAKING SHAPED HONEYCOMB STRUCTURES

(75) Inventor: Seshagiri R. Devaguptapu, Lake Villa, IL (US)

(73) Assignee: Pactiv Corporation, Lake Forest, IL (US)

( * ) Notice: Subject to any disclaimer, the term of this patent is extended or adjusted under 35 U.S.C. 154(b) by 0 days.

(21) Appl. No.: 09/321,800

(22) Filed: May 27, 1999

Related U.S. Application Data
(60) Provisional application No. 60/087,095, filed on May 28, 1998.

(51) Int. Cl.[7] .................................................. B32B 3/12
(52) U.S. Cl. ....................................... 428/116; 156/197
(58) Field of Search ........................... 428/116; 156/197

(56) References Cited

U.S. PATENT DOCUMENTS

| | | | |
|---|---|---|---|
| 2,006,224 A | 6/1935 | Weber et al. ................... 206/60 |
| 2,024,224 A | 12/1935 | Humphner .................... 154/43 |
| 2,651,588 A | 9/1953 | Bruce et al. ................ 154/53.5 |
| 2,704,587 A | 3/1955 | Pajak ............................ 189/34 |
| 3,179,023 A | 4/1965 | Hoff ................................. 93/1 |
| 3,220,683 A | 11/1965 | Doll ......................... 248/354.1 |
| 3,555,137 A | 1/1971 | Carmody ..................... 264/148 |
| 3,655,112 A | 4/1972 | Jeffers ....................... 229/14 C |
| 3,843,038 A | 10/1974 | Sax ........................... 229/14 C |
| 3,866,523 A | 2/1975 | Geschwender ............. 93/58 ST |
| 3,890,919 A | 6/1975 | Welsh ........................ 29/191.4 |
| 3,900,156 A | 8/1975 | Clark, Jr. .................. 229/14 C |
| 3,955,677 A | 5/1976 | Collingwood ............... 206/453 |
| 3,994,433 A | 11/1976 | Jenkins et al. ............. 229/14 C |
| 4,496,054 A | 1/1985 | Koltun ........................ 206/586 |
| 4,529,091 A | 7/1985 | Martin ........................ 206/586 |
| 4,548,665 A | * 10/1985 | Morin ......................... 156/197 |
| 4,793,267 A | * 12/1988 | Birillo ........................ 108/108 |
| 4,883,179 A | 11/1989 | Dionne ....................... 206/523 |
| 5,040,696 A | 8/1991 | Liebel ......................... 220/441 |
| 5,175,041 A | 12/1992 | Webb et al. ................ 428/116 |
| 5,466,211 A | 11/1995 | Komarek et al. ........... 493/355 |
| 5,511,667 A | 4/1996 | Carder ........................ 206/586 |
| 5,680,934 A | 10/1997 | Jaegers et al. .............. 206/586 |
| 5,804,030 A | 9/1998 | Jaegers et al. .............. 156/510 |
| 5,919,545 A | * 7/1999 | Giezendanner et al. ..... 428/116 |
| 5,992,112 A | * 11/1999 | Josey ......................... 52/309.8 |
| 6,036,802 A | * 3/2000 | Banks et al. ................ 156/197 |

FOREIGN PATENT DOCUMENTS

| | | |
|---|---|---|
| DE | 420 0024 A1 | 7/1993 |
| FR | 1125550 | 10/1956 |
| FR | 2690870 A1 | 11/1993 |
| GB | 2081678 A | 2/1982 |
| WO | WO 96/00150 | 1/1996 |

* cited by examiner

*Primary Examiner*—Deborah Jones
*Assistant Examiner*—Abraham Bahta
(74) *Attorney, Agent, or Firm*—Jenkens & Gilchrist PC

(57) ABSTRACT

A shaped honeycomb structure having a permanently fixed fold portion. The shaped honeycomb structure has a honeycomb core with a plurality of abutting partition walls defining a plurality of abutting hollow cell faces on a top side and a bottom side of the honeycomb core. The fold portion defines a first panel portion converging with a second panel portion. At the fold portion, the partition walls are generally not vertically deformed. The shaped honeycomb structure may be made by a method comprising expanding an unexpanded honeycomb core to form an expanded honeycomb core comprising a plurality of abutting partition walls forming a plurality of cells defining a plurality of abutting hollow cell faces on a top side and a bottom side of the expanded honeycomb core. The expanded honeycomb core is impregnated with a resin. The fold portion is formed in the expanded honeycomb core such that the partition walls are generally not vertically deformed at the fold portion. The resin impregnated folded honeycomb core is then completely cured to permanently rigidly fix the plurality of abutting partition walls into the plurality of abutting hollow cell faces with the fold portion.

15 Claims, 5 Drawing Sheets

SHAPED HONEYCOMB STRUCTURES AND METHOD AND APPARATUS FOR MAKING SHAPED HONEYCOMB STRUCTURES

RELATED APPLICATIONS

This application claims the benefit of copending U.S. Provisional Patent Application Ser. No. 60/087,095, filed May 28, 1998.

BACKGROUND OF THE INVENTION

1. Field of the Invention

The present invention relates generally to honeycomb structures, and more particularly, to shaped honeycomb structures and the method and apparatus for making the shaped honeycomb structures.

2. Description of the Related Art

Honeycomb core or paper honeycomb structure is a three-dimensional lattice formed by a plurality of abutting partition walls. The partition walls are arranged in a generally oval or hexagonal honeycomb pattern to form hexagonal cells. The hexagonal cells have opposed bottom and top hollow-cell hexagonal faces on opposite sides of the core respectively.

Typically, honeycomb core is constructed from unbleached kraft paper; however, other types of paper or paperboard, including recycled fibers, may be used. Additionally, the hollow-cells of the core can be resin-impregnated for water resistance. Other materials, such as plastic film can be used on the cells if desired. The width of the cells, the height of the partition walls, and the weight of the kraft paper can all be varied to impart various characteristics to the honeycomb core as well known to one of ordinary skill in the art.

Conventional honeycomb structures, typically called honeycomb panels, have generally perpendicular partition walls and a general hexagonal cell pattern rigidly fixed in place by a cured resin such as phenolic formaldehyde as known to one of ordinary skill in the art. The typical honeycomb panel further includes the rigid honeycomb core sandwiched between a top face sheet and a bottom face sheet. The top and bottom face sheets respectively are abutted against and adhesively secured to the top and bottom hollow-cell faces of the honeycomb core, respectively. The top and bottom face sheets may be made of a kraft paper; however, other materials such as metal foil and plastic sheet may be used.

Conventional honeycomb structures exhibit high compression and impact strength. Because of the honeycomb panels' high strength and durability combined with their light weight, honeycomb panels have many uses, such as protective packaging and as structural cores. For example, honeycomb panels may be used in module office furniture dividers. Additionally, honeycomb panels may be used as corner or edge protectors in the packaging industry.

Often to use honeycomb panels as structural cores or as protective packaging, the honeycomb panel must be folded into a desired shape. For example, a simple edge is protector consists of a honeycomb panel folded into two portions to conform to the two intersecting surfaces of the corner. To fold the honeycomb panel, the panel is typically pressure scored, slit scored, V-cut scored or angle crush slit scored.

A pressure score is typically formed by pressing a cylinder into the honeycomb panel forming an arced depression. The arced depression of the pressure score provides a hinge about which the honeycomb panel may be folded. One shortcoming of shaping the honeycomb panel using the pressure score is that the pressure-scored panel often does not fold predictably along the chosen line. Additionally, the pressure-scored panel is difficult to fold and readily returns to its flat position. Furthermore, the pressure score lowers the compression and impact strength at the fold.

A slit score is typically formed by a knife cutting completely through the top face sheet and the honeycomb core, leaving only the bottom face sheet intact to act as a hinge. The panel is then folded away from the slit. One shortcoming of shaping the honeycomb panel using the slit score is the corner impact strength is low because only the second face sheet protects the corner.

A V-cut score is typically formed by sawing a V-shaped trough through the top face sheet and into the honeycomb core with the vertex of the V being just above the second face sheet. The panel is then folded about the V-shaped trough. One short coming of the V-cut score is the complexity of equipment needed to cut and remove V-shaped trough. Additionally, the V-cut panel readily returns to its flat position after being folded unless an adhesive is applied to hold the panel in the folded position.

An angle crush slit score is typically formed by slitting the top face sheet and driving a wedge into the honeycomb core to crush the core to a predetermined depth at a predetermined angle. The panel is then folded about the angle crush slit score. The angle crush slit score is described in U.S. Pat. No. 5,466,211 entitled "Method and Apparatus for Manufacturing Articles Employing Folded Honeycomb Panels." One shortcoming of the angle crush slit score panel is that it readily returns to its flat position after being folded unless an adhesive is applied to maintain the panel in the folded position.

Thus, a need has arisen for shaped honeycomb structures which will provide a structurally sound honeycomb core, which will provide high compression and impact strength and which will retain the desired shape and for a method and apparatus for forming the shaped honeycomb structures.

SUMMARY OF THE INVENTION

In accordance with one aspect of the present invention, there is provided a shaped honeycomb structure comprising a honeycomb panel having a plurality of abutting partition walls forming a plurality of abutting cells defining a plurality of abutting top and bottom hollow cell faces respectively. The shaped honeycomb structure also includes a permanently fixed fold in the panel defining a first panel portion and a second panel portion. The first panel portion converges at an angle with the second panel portion at the fold. The partition walls of the fold are not vertically deformed. At the fold, the top hollow cell faces are laterally compressed, and the bottom hollow cell faces are laterally expanded. The shaped honeycomb structure may further include a top face sheet adhered to the top hollow cell faces and/or a bottom face sheet adhered to the bottom hollow cell faces.

In accordance with another aspect of the present invention, there is provided a method of forming a shaped honeycomb structure comprising expanding an unexpanded honeycomb core comprising a plurality of strips of material adhered together to form an expanded honeycomb core comprising a plurality of abutting partition walls forming a plurality of cells defining a plurality of abutting hollow cell faces on a top side and a bottom side of the expanded honeycomb core. The expanded honeycomb core is impregnated with a resin. The method further comprises forming a fold portion in the expanded honeycomb core. In the fold portion, the partition walls are not vertically deformed, the top hollow cell faces are laterally compressed and the bottom hollow cell faces are laterally expanded. The method further includes completely curing the resin of the honeycomb core with the fold portion to permanently rigidly fix the plurality of abutting partition walls into the plurality of abutting hollow cell faces with the fold portion. The method may further include a step of partially curing the resin of the expanded honeycomb core to generally flexibly fix the plurality of abutting partition walls into the plurality of abutting hollow cell faces. Additionally, the method may further comprise a step of adhering a top face sheet to the top hollow cell faces and/or adhering a bottom face sheet to the bottom hollow cell faces with said top hollow cell faces of the honeycomb core having said fold portion.

In accordance with a further aspect of the present invention, there is provided an apparatus for forming a shaped honeycomb structure comprising a fold portion. The apparatus comprises an expanding station capable of expanding an unexpanded honeycomb core comprising a plurality of strips of material glued together to form an expanded honeycomb core comprising a plurality of abutting partition walls forming a plurality of cells defining a plurality of abutting hollow cell faces on a top side and a bottom side of the expanded honeycomb core. The expanded honeycomb core being impregnated with a resin. The apparatus also includes a forming station capable of placing a fold in the expanded honeycomb core. At the fold, the partition walls are not vertically deformed, the top hollow cell faces are laterally compressed and the bottom hollow cell faces are laterally expanded. The forming station is further capable of completely curing the resin of the honeycomb core with the fold to permanently fix the plurality of abutting partition walls into the plurality of abutting hollow cell faces with the fold. The apparatus may further include a partial curing station capable of partially curing the resin of the impregnated expanded honeycomb core to generally flexibly fix the plurality of abutting partition walls into the plurality of abutting hollow cell faces. The apparatus may further include a gluing station capable of applying an adhesive to the top hollow cell faces to adhere a top face sheet to the top hollow cell faces.

BRIEF DESCRIPTION OF THE DRAWINGS

The foregoing and other advantages of the invention will become apparent upon reading the following detailed description and upon reference to the drawings which.

Figure 1:
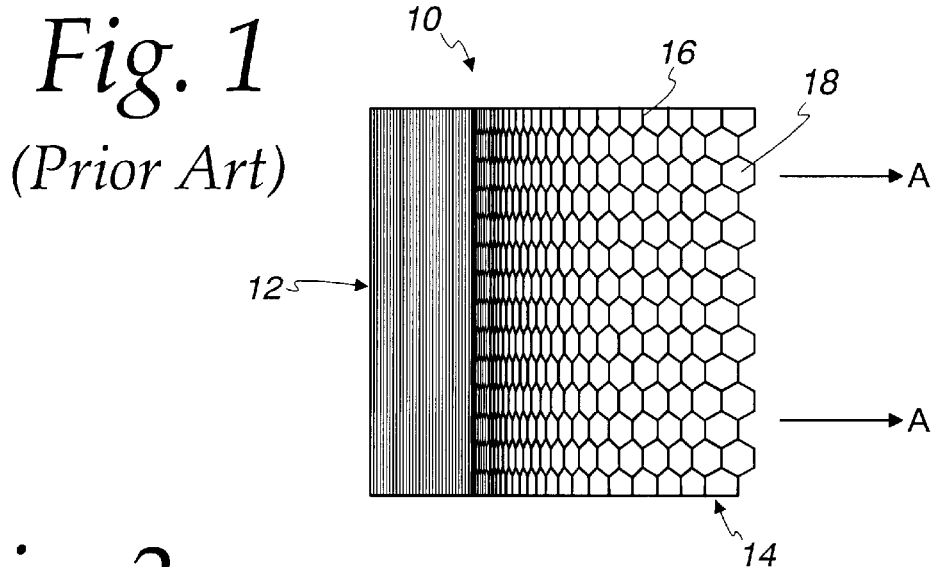
FIG. 1 is a top view of an unexpanded honeycomb core expanding into an expanded honeycomb core.

While the invention is susceptive to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the appended claims.

DESCRIPTION OF ILLUSTRATIVE EMBODIMENTS

Surprisingly, it has been discovered that the shaped honeycomb structures of the present invention provide structurally sound honeycomb core with high compression and impact strength and high durability while retaining their desired shape. Additionally, it has been discovered that a method and apparatus for forming the shaped honeycomb structures of the present invention provide the shaped honeycomb structures. Furthermore, the method and apparatus of the present invention has been found to form shaped honeycomb structures in a wide variety of unique shapes for many applications.

The shaped honeycomb structures of the present invention are composed of typical honeycomb core. FIG. 1 illustrates typical honeycomb core 10 in both an unexpanded state 12 and an expanded state 14. Honeycomb core 10 is typically formed by successively cutting a sheet of kraft paper into a plurality of strips and adhering the strips to each other with an adhesive. The strips form the three-dimensional lattice of a plurality of abutting partition walls 16 which are arranged in a generally oval or hexagonal honeycomb pattern to form hexagonal cells 18. A machine for making honeycomb core is described in WO 96/00150 entitled "Machine for Making Honeycomb Material" assigned the present assignee and is incorporated by reference herein.

A typical machine for making honeycomb core produces unexpanded core 12. The unexpanded core 12 consists of the strips of paper adhered to each other compacted together. The unexpanded core 12 is then expanded to form the hexagonal cells 18 with their generally oval or hexagonal honeycomb pattern. The unexpanded honeycomb core 12 is expanded into expanded honeycomb core 14 by pulling the core in a lateral direction as illustrated by arrows A. The unexpanded honeycomb core 12 may be expanded into expanded honeycomb core 14 at an expanding station (not shown) as known in the art.

Figure 2:
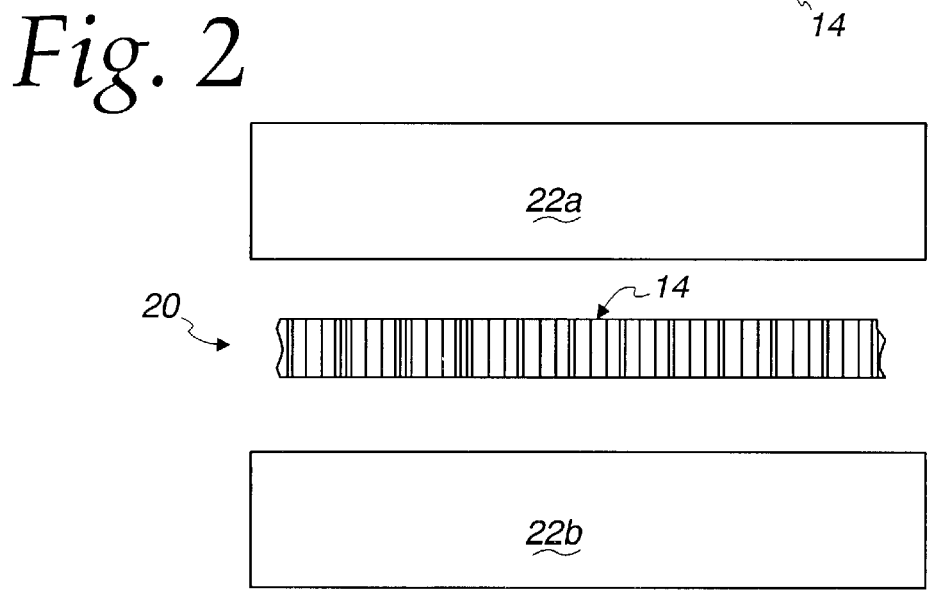
FIG. 2 is a front view of a drying and setting station of the present invention.

To fix the expanded core 14 in the hexagonal cell pattern 18, the expanded core 14 is placed in a drying and setting station 20. FIG. 2 illustrates one embodiment of a drying and setting station 20. The drying and setting station 20 comprises heating means 22a and 22b which provide heat to the expanded core 14. The heating means 22a and 22b may be heat lamps, an oven, a kiln or any means for raising the temperature of the expanded core 14 and/or the air surrounding the expanded core 14.

The kraft paper of the honeycomb core 14 is impregnated with a resin such as phenolic formaldehyde resin or melamine formaldehyde resin or other resins known in the art. Typically, the kraft paper is impregnated with the phenolic formaldehyde and/or melamine formaldehyde resin prior to being cut into a plurality of slits before forming into unexpanded honeycomb core 12; however, the kraft paper may be impregnated with the resin after being formed into unexpanded core 12. The phenolic formaldehyde and melamine formaldehyde resins are a heat activated resin. When the resin impregnated paper is fully cured or heated to a certain temperature for a certain time interval, the paper stiffens into a fixed rigid inflexible formation as known to one skilled in the art. For example, honeycomb core impregnated with phenolic formaldehyde and melamine formaldehyde resins is fully cured by heating the core to a temperature range from about 200° F. to about 355° F. for a time ranging from about thirty seconds to about six minutes.

Figure 3:
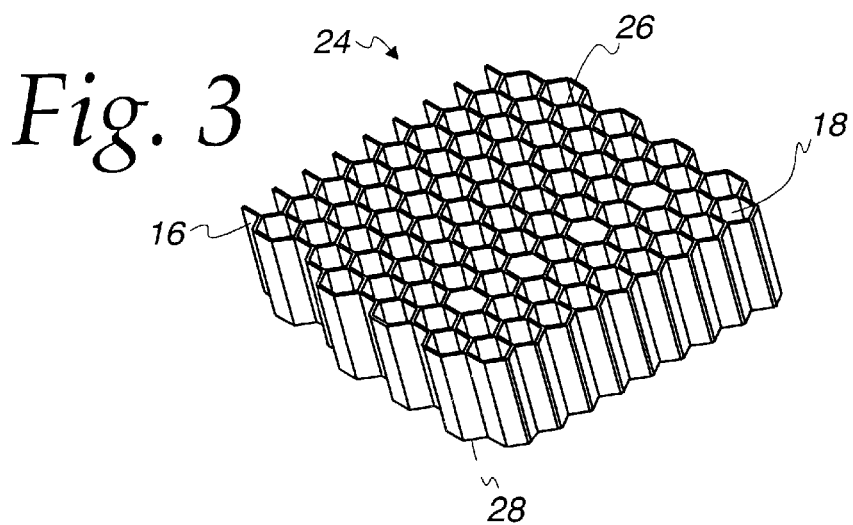
FIG. 3 is a isometric view of an expanded honeycomb core.

When the expanded core 14 is placed in the drying and setting station 20, the heating means 22a and 22b supply heat to convection heat the expanded core 14 and raise its temperature to cure or set the resin. In one embodiment of the present invention, the expanded core 14 is placed in the drying and setting station 20 and partially cured to a point at which the core 14 retains the generally oval or hexagonal honeycomb pattern. FIG. 3 illustrates the partially cured core 24. The core 24 is then removed from the drying and setting station 20 before completely curing the resin. Complete curing of the resin in the drying and setting apparatus 20 results in rigid hexagonal cells 18 with their generally oval or hexagonal honeycomb pattern permanently locked in place having generally perpendicular partition walls 16. On the other hand, partial curing the resin, such as 25% curing, results in the core 24 being generally fixed in the hexagonal honeycomb pattern with the hexagonal cells 18, yet the core 24 is highly flexible with the ability to readily formed into shapes. To partial cure the resin, the resin impregnated core is subjected to a range of about 10% to about 60% of the heat transfer required for fully curing the resin and more preferably from about 20% to about 40% of the heat transfer required for fully curing the resin. For example, a resin impregnated core may be partially cured at a temperature ranging from about 280° F. to about 300° F. for approximately two minutes.

FIG. 3 illustrates the partially cured honeycomb core 24. The partially cured honeycomb core 24 maintains the three-dimensional lattice formed by a plurality of abutting partition walls 16. The partition walls 16 maintain the generally oval or hexagonal honeycomb pattern to form hexagonal cells 18. The hexagonal cells 18 have a top hollow-cell hexagonal faces 26 opposed to a bottom hollow-cell hexagonal faces 28 on the opposite side of the core 24.

Figure 4:
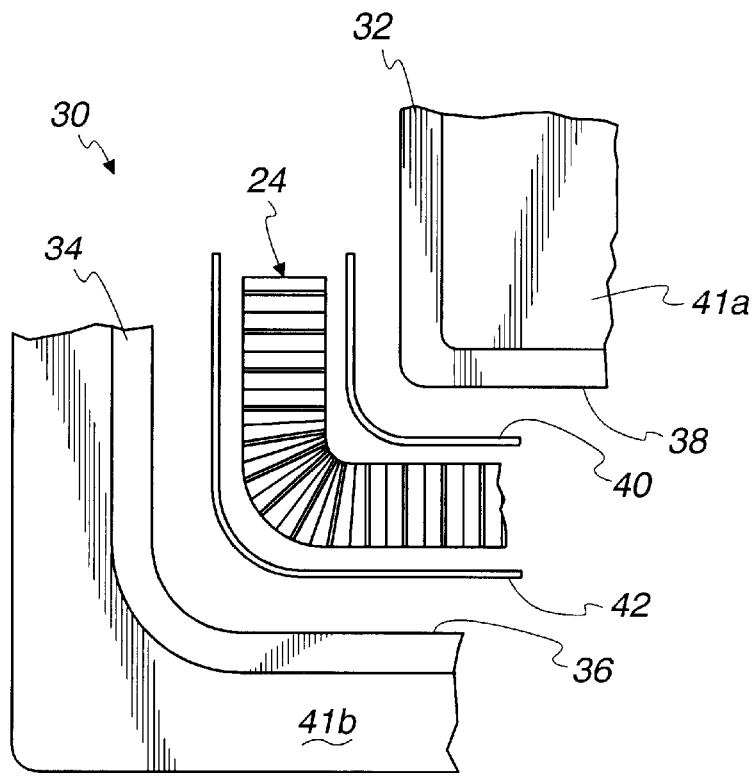
FIG. 4 is a front view of a forming station in an open position of the present invention.

In one embodiment of the invention, once the core 24 is partially cured, it is shaped or folded at a forming station 30. FIG. 4 illustrates the forming station 30 in an open position. The forming station 30 folds or bends the core 24 into the desired shape and fully cures the partially cured core 24 to rigidly and permanently fix the core 24 in the desired shape. The forming station 30 generally comprises an upper mold 32 and a bottom mold 34. In the open position of the forming station 30, the upper mold 32 is separated from the bottom mold 34 a distance sufficient to place the core 24 into the forming station 30. The molds 32 and 34 cooperating together to form the desired shape for the core 24. The molds 32 and 34 depicted in FIG. 4 provide generally L-shaped mold surfaces 36 and 38 respectively to shape the core 24 into a generally L-shape. The molds 32 and 34 are generally composed of a conductive metal, such as aluminum, copper or stainless steel, to easily conduct heat for fully curing the core 24.

The forming station 30 also includes heating means 41a and 41b to heat the core 24 to fully cure the resin and rigidly fix the core 24 in the desired shape. The heating means 41a and 41b may be any heat providing device known in the art, such as an oven, kiln, heat lamps or heating element within the metal molds 32 and 34. For example, the core 24 that was partially cured at a temperature ranging from about 280° F. to about 300° F. for approximately two minutes may be fully cured by the heating means 41a and 41b in the forming station 30 at a temperature range from about 280° F. to about 300° F. for approximately 3 minutes.

In addition to shaping and fully curing the core 24, the forming station may also be used to adhere a top face sheet 40 to the top hollow-cell hexagonal face 26 and a bottom face sheet 42 to the bottom hollow-cell hexagonal face 28. The face sheets 40 and 42 may comprise kraft paper or any material known in the art such as metal foil and plastic sheet. In one embodiment, the face sheets 40 and 42 are impregnated with a resin such as phenolic formaldehyde or melamine formaldehyde resin on the side that abuts the top and bottom hollow-cell hexagonal faces 26 and 28. In another embodiment, both sides of the face sheets 40 and 42 are impregnated with the resin. In a further embodiment, the face sheets 40 and 42 are not impregnated with a resin.

In one embodiment of the present invention with face sheets 40 and 42 impregnated with resin, the face sheets 40 and 42 may be formed into the desired shape prior to adhering the face sheets 40 and 42 to the core 24. For example, the face sheets may be preformed into the desired L-shape by placing the face sheet against the mold surface 36 and fully curing the resin impregnated face sheet. The resulting cured face sheet rigidly maintains the L-shape. The preshaped face sheets 40 and 42 are then adhered to the top and bottom hollow-cell hexagonal faces 26 and 28 using the forming station 30. In another embodiment the face sheets may be placed into the forming station 30 uncured with no fixed shape.

To adhere the face sheets 40 and 42 to the core 24, an adhesive is placed on the top hollow-cell hexagonal face 26 and the bottom hollow-cell hexagonal face 28 prior to placing the core 24 in the open forming station 30. The adhesive may be any type of adhesive known in the art for adhering face sheets to honeycomb core, such as CR583. The adhesive may be placed on the top hollow-cell hexagonal face 26 and the bottom hollow-cell hexagonal face 28 in a gluing station (not shown) as known in the art. As illustrated in the open forming station 30 of FIG. 4, the top face sheet 40 is placed between the top hollow-cell hexagonal face 26 and the upper mold surface 38 and the bottom face sheet 42 is placed between the bottom hollow-cell hexagonal face 28 and the upper mold surface 36.

Figure 5:
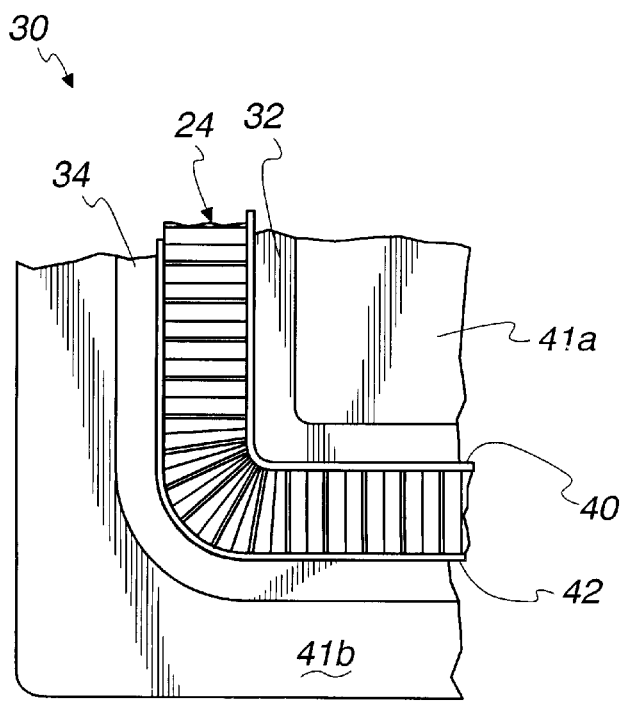
FIG. 5 is a front view of the forming station of FIG. 4 in a closed position.

To shape the core 24 and to adhere the face sheets 40 and 42 to the core 24, the forming station 30 is move to a closed position. FIG. 5 illustrates the closed forming station 30. In the closed position, the upper mold 32 and the bottom mold 34 move together to sandwich the core 24 and face sheets 40 and 42 between the upper mold surface 38 and bottom mold surface 36. When the forming station 30 closes, the core 24 conforms to the shape of the mold surfaces 36 and 38 and the face sheets 40 and 42 abut and adhere to the core 24 to form the shaped honeycomb structure 44.

In the closed position, the forming station 30 completely cures the shaped honeycomb structure with the heating means 41a and 41b. The forming station 30 remains closed and heated to a certain temperature range for a certain time interval in order to cure the shaped honeycomb structure 44 resulting in the rigid and inflexible L-shaped configuration. While the structure 44 is being completely cured, the adhesive is dried to adhere the face sheets 40 and 42 to the core 24. For example, the core 24 that was partially cured at a temperature ranging from about 280° F. to about 300° F. for approximately two minutes may be fully cured in the forming station 30 at a temperature range from about 280° F. to about 300° F. for approximately 3 minutes.

Figure 6:
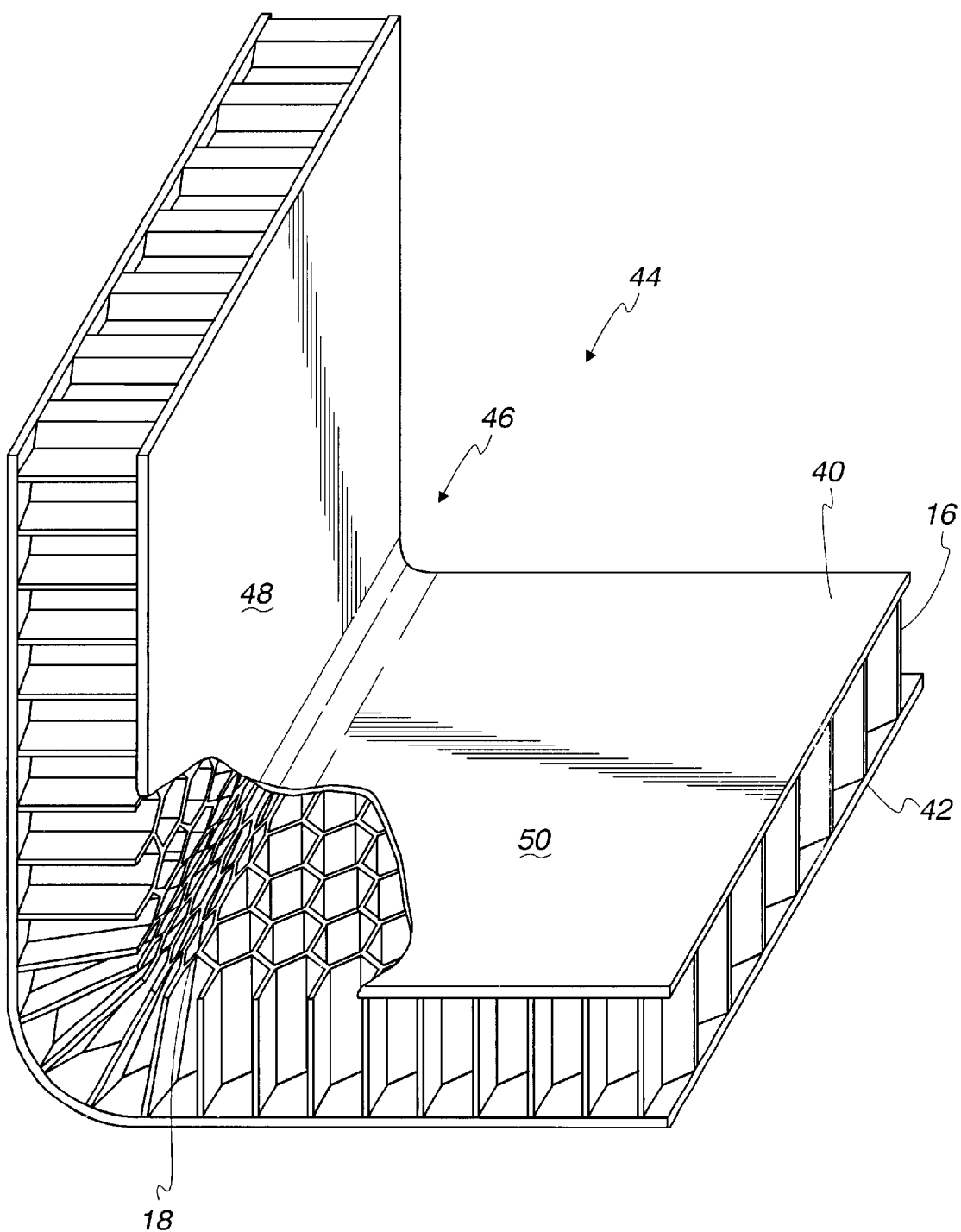
FIG. 6 is a isometric view of a shaped honeycomb structure of the present invention.

FIG. 6 illustrates the shaped honeycomb structure 44 made in the forming station 30. The shaped honeycomb structure 44 has a rigid L-shaped configuration with a fold 46 and a first flat portion 48 and a second flat portion 50. At the fold 46, the top hollow-cell hexagonal face's peripheral portions of the partition walls 16 are compressed toward each other and the top hollow-cell hexagonal face's hexagonal cells 18 are laterally flattened and compressed. The peripheral walls 16 at the top hollow-cell face 26 at the fold 46 are closer together than the top hollow-cell face 26 peripheral walls 16 at the first and second flat portions 48 and 50. At the bottom hollow-cell hexagonal face, the bottom peripheral portions of the partition walls 16 are expanded away from each other and the bottom hexagonal cells 18 are laterally expanded. The peripheral walls 16 at the bottom hollow-cell face 28 at the fold 46 are spacer further apart than the bottom hollow-cell face 28 peripheral walls 16 at the first and second flat portions 48 and 50. At the fold 46, the partition walls are generally not vertically deformed, and the core remains structurally intact. Because the core at the fold 46 is intact, the folded area 46 of the shaped honeycomb structure 44 retains the strength, durability and rigidity characteristics of the typical honeycomb panel providing high compression and impact strength at the fold 46.

As discussed above, in one embodiment of the L-shaped honeycomb structure, both sides of the face sheets 40 and 42 are impregnated with the resin. The resulting L-shaped structure has high impact resistance at the fold 46 due to rigidity provided by the cured resin on both sides of the face sheets. On the other hand, for the embodiment where only one side of the face sheets 40 and 42 are impregnated with resin, the resulting L-shaped structure is more flexible at the fold 46 and is more forgiving to impacts than the two sided impregnated face sheet structure. Furthermore, for the embodiment where the face sheets 40 and 42 are not impregnated, the resulting L-shaped structure has the greatest flexibility at the fold 46. The flexibility at the fold 46 in these embodiments refers to the flexibility provided by the face sheets 40 and 42 because the fully cured core 24 at the fold 46 is inflexible.

Figure 7A:
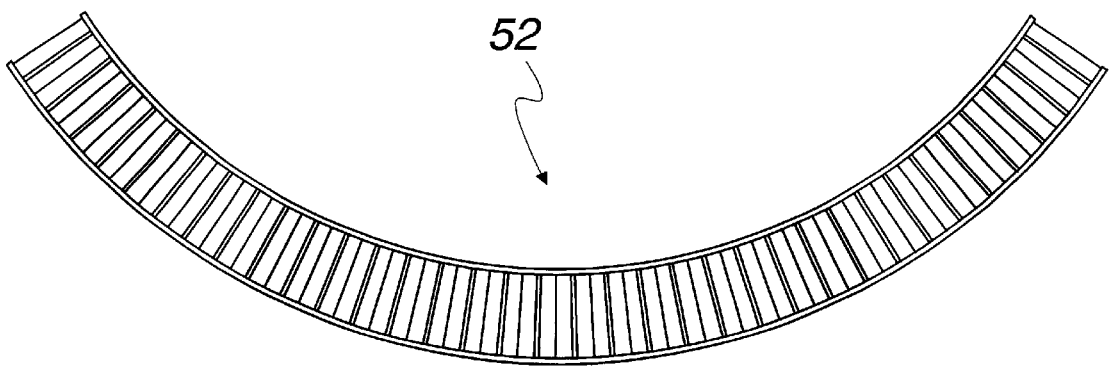
FIG. 7a is a front view of another shaped honeycomb structure of the present invention.
Figure 7B:
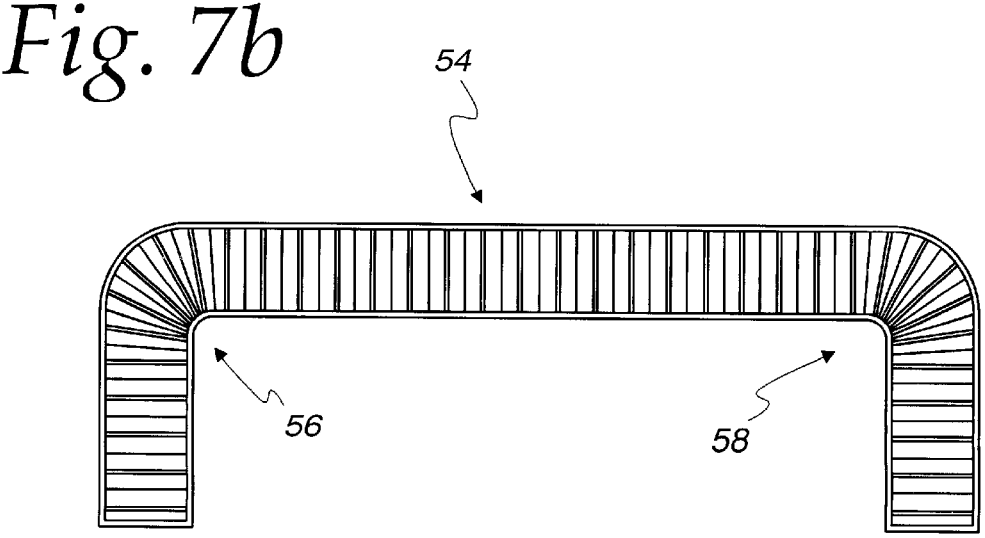
FIG. 7b is a front view of another shaped honeycomb structure of the present invention.

In addition to the L-shaped honeycomb structure 46 illustrated in FIG. 6, shaped honeycomb structures can be formed in a wide variety of shapes and forms. For example, FIG. 7a illustrates an arced shaped honeycomb structure 52. The arced shaped honeycomb structure 52 may be formed as described above using an arc shaped upper and lower molds. In the arced shaped honeycomb structure 52, the peripheral walls 16 at the top hollow-cell face 26 are closer together than peripheral walls 16 of the bottom-hollow cell face 28. FIG. 7b illustrates a U-shaped honeycomb structure 54 with a first fold 56 and a second fold 58. The first and second folds 56 and 58 are similar to the fold 46 of the L-shaped honeycomb structure 44 described above. The U-shaped honeycomb structure 54 may be formed as described above using U-shaped upper and lower molds. Other shaped honeycomb structures may be made using the present invention, such as, but not limited to, circular, rectangular, polygonal, and W-shaped honeycomb structures.

The shaped honeycomb structures have many applications including as structural core and as protective packaging. For example, the L-shaped honeycomb structure illustrated in FIG. 6 may be used as the structural core for a bathroom tub enclosure. The L-shaped honeycomb structure would be the structural core of the corners of the tub enclosure. Additionally, the L-shaped honeycomb structures may be used as structural core for the corners office partitions or dividers. Furthermore, the L-shaped honeycomb structure may be used as an edge protector to protecting products such as furniture during shipping. The shaped honeycomb structures may be modified for any application, such as coating the top and bottom face sheets with fiberglass or other materials. Additionally, the shaped honeycomb structures may be coated with water resistant materials or made from water resistant adhesives for use in high humidity applications. The shaped honeycomb structures are advantageous for many applications because they may be formed into any variety of shapes for specific applications.

Figure 8:
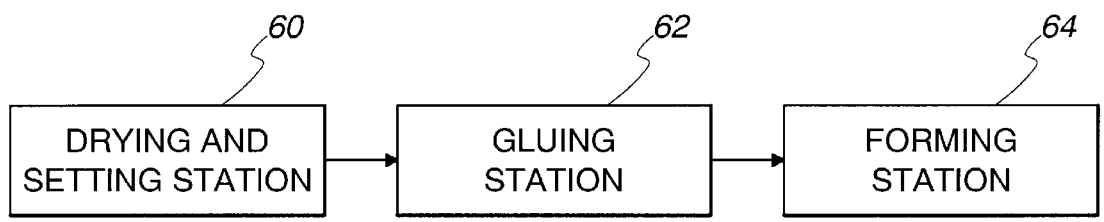
FIG. 8 is a process diagram of one embodiment for manufacturing shaped honeycomb structures of the present invention.

The shaped honeycomb structures of the present invention may be manufactured according to the process described above. FIG. 8 is a process diagram of the manufacturing process according to one embodiment of the present invention. First, the unexpanded core is expanded and partially cured at a drying and setting station 60. Once the expanded core is partially cured, the core retains the generally oval or hexagonal honeycomb cell pattern, yet the core is highly flexible and easily shaped. Next, the partially cured core is moved to a gluing station 62. At the gluing station 62, adhesive is applied to both the top and bottom hollow-cell hexagonal faces. Once the adhesive is applied, the core is positioned between a top face sheet and a bottom face sheet in a forming station 64 in its open position. The top face sheet and bottom face sheet may or may not be preshaped prior to adhering them to the core. The forming station 64 is closed to conform the core to the shape of the upper and lower molds and to adhere the top and bottom face sheets to the core. The forming station heats the core and face sheets to fully cure the shaped honeycomb structure and to dry the adhesive adhering the face sheets to the core. The shaped honeycomb structure is then removed from the forming station; the shaped honeycomb structure rigidly retains the desired shape provided by the upper and lower molds.

Figure 9:
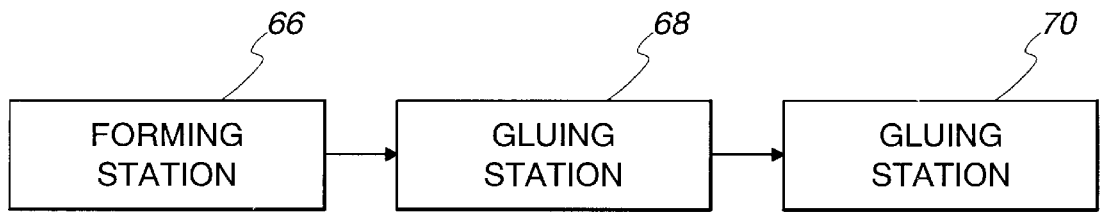
FIG. 9 is a process diagram of another embodiment for manufacturing shaped honeycomb structures.

FIG. 9 is a process diagram of the manufacturing process for making shaped honeycomb structures according to another embodiment of the present invention. First, the unexpanded core is expanded and partially cured at a forming station 66. The core is expanded and placed within the forming station 66 in its open position. The forming station 66 is closed to sandwich the expanded core between the upper and lower molds. The forming station 66 then supplied heat to partially cure the core. Once the expanded core is partially cured, the core retains the generally oval or hexagonal honeycomb cell pattern and general shape conforming to the shape of the upper and bottom molds, yet the core is highly flexible. Next, the partially cured core is moved to a gluing station 68. At the gluing station 68, adhesive is applied to both the top and bottom hollow-cell hexagonal faces of the core. Once the adhesive is applied, the core is positioned between a top face sheet and a bottom face sheet in a forming station 70 in its open position. The top face sheet and bottom face sheet may or my not be preshaped prior to adhering them to the core. The forming station 70 may be the same forming station 66. The forming station 70 is closed to conform the core to the shape of the upper and lower molds and to adhere the top and bottom face sheets to the core. The forming station 70 heats the core and face sheets to dry the adhesive adhering the face sheets to the core and to completely cure the shaped honeycomb structure. The shaped honeycomb structure is then removed from the forming station rigidly retaining the desired shape. Other methods may be used for manufacturing the shaped honeycomb structures as long as the expanded core is shaped prior to completely curing the core.

While particular embodiments and applications of the present invention have been illustrated and described, it is to be understood that the invention is not limited to the precise construction and compositions disclosed herein and that various modifications, changes, and variations will be apparent from the foregoing descriptions without departing from the spirit and scope of the invention as defined in the appended claims.

What is claimed is:

1. A shaped honeycomb structure comprising
   a honeycomb panel having a plurality of abutting partition walls forming a plurality of abutting cells defining a plurality of abutting top and bottom hollow cell faces respectively;
   a permanently fixed fold in said panel defining a first panel portion and a second panel portion, said first panel portion converging at an angle with said second panel portion at said fold, said partition walls of said fold being generally not vertically deformed.

2. The shaped honeycomb structure of claim 1 further including a top face sheet adhered to said top hollow cell faces.

3. The shaped honeycomb structure of claim 2 wherein said top face sheet is composed of cured resin impregnated paper.

4. The shaped honeycomb structure of claim 1 further including a bottom face sheet adhered to said bottom hollow cell faces.

5. The shaped honeycomb structure of claim 1 wherein said first panel portion converges with said second panel portion at said permanent fold, said permanent fold being generally L-shaped.

6. The shaped honeycomb structure of claim 1 wherein said first panel portion converges with said second panel portion at said permanent fold, said permanent fold being generally arc-shaped.

7. The shaped honeycomb structure of claim 1 wherein said top hollow cell faces are laterally compressed and said bottom hollow cell faces are laterally expanded at said permanent fold.

8. The shaped honeycomb structure of claim 1 wherein said panel is composed of cured resin impregnated paper.

9. A shaped honeycomb structure comprising
   a honeycomb panel having a plurality of abutting partition walls forming a plurality of abutting cells defining a plurality of abutting top and bottom hollow cell faces respectively, said panel being composed of cured resin impregnated paper; and
   a permanently fixed fold in said panel such that said top hollow cell faces are laterally compressed and said bottom hollow cell faces are laterally expanded at said permanent fold, said partition walls of said fold being generally not vertically deformed.

10. A protective honeycomb structure comprising:
    a first honeycomb panel having a plurality of abutting partition walls forming a plurality of abutting cells, said first honeycomb panel having top and bottom face sheets adhered to said abutting cells;
    a second honeycomb panel having a plurality of abutting partition walls forming a plurality of abutting cells, said second honeycomb panel having top and bottom face sheets adhered to said abutting cells; and
    a fold region between said first honeycomb panel and said second honeycomb panel, said fixed fold having a plurality of abutting partition walls forming a plurality of abutting cells, said abutting partition walls being generally straight and intact.

11. The protective honeycomb structure of claim 10 wherein said fold region is generally arc-shaped.

12. The protective honeycomb structure of claim 11 wherein said abutting partition walls in said fold region include top peripheral portions and bottom peripheral portions, said top peripheral portions being laterally spaced more closely than said bottom peripheral portions.

13. A protective honeycomb structure comprising:
    a first flat portion comprised of honeycomb material;
    a fold portion; and
    a second flat portion comprised of honeycomb material, said first flat portion, fold portion and second flat portion being comprised of a single piece of honeycomb material, said fold portion including a honeycomb wall structure having upper peripheral portions and lower peripheral portions, said upper peripheral portions being laterally spaced more closely than said lower peripheral portions.

14. The protective honeycomb structure of claim 13 wherein said honeycomb wall structure includes partition walls, said partition walls in said fold portion being generally vertically intact.

15. The protective honeycomb structure of claim 13 wherein said fold structure is fixed.

* * * * *